UNITED STATES PATENT OFFICE.

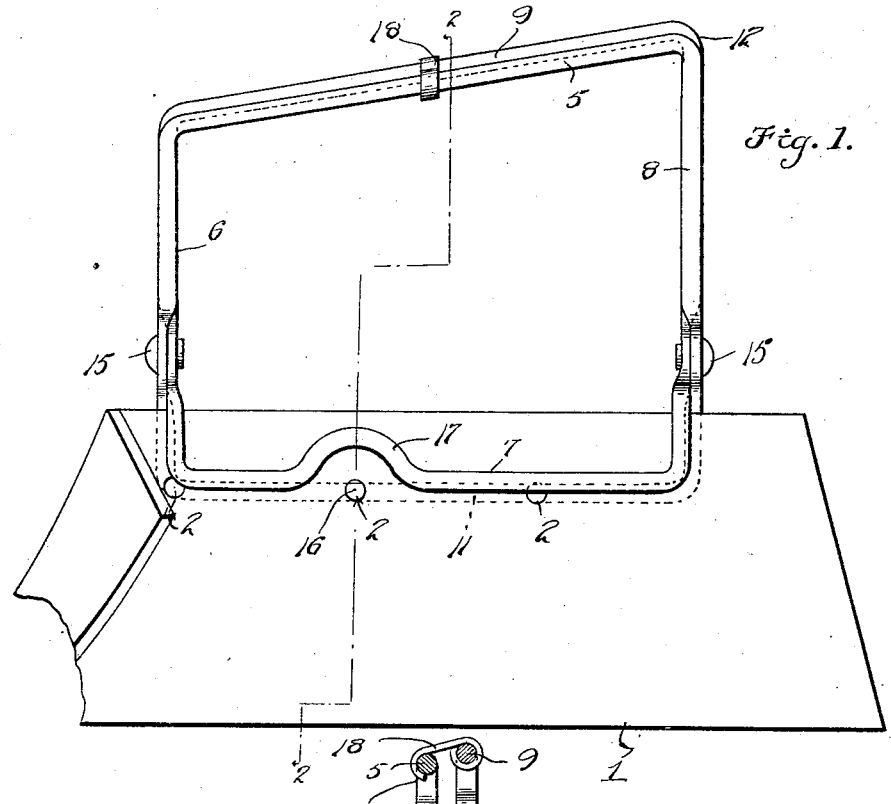

GUY R. KEMPTHORNE, OF REWEY, WISCONSIN.

PLOW-LAY HOLDER.

1,279,877.  Specification of Letters Patent.  Patented Sept. 24, 1918.

Application filed June 26, 1916. Serial No. 106,038.

*To all whom it may concern:*

Be it known that I, GUY R. KEMPTHORNE, a citizen of the United States, residing at Rewey, in the county of Iowa and State of Wisconsin, have invented certain new and useful Improvements in Plow-Lay Holders, of which the following is a specification.

This invention relates to a plow lay holder which may be removably secured to the body of the plow.

The primary object of the present invention is to provide a tool of the class referred to which will securely hold the plow lay between opposed jaws of substantially corresponding length whereby the plow lay may be sharpened or otherwise repaired.

Another object of the present invention is to provide a tool of this class which comprises two substantially quadrilateral members pivoted together, the sides thereof coöperating to form the tongs and one side being provided with means projecting through the plow lay to prevent the latter from slipping longitudinally of the tool when in use.

A further object resides in the provision of means for clamping the tongs in the operative position.

With the above and other objects in view, which will be hereinafter more fully set forth, I will now proceed to describe a specific embodiment of the present invention as shown in the accompanying drawing forming a part hereof, and in which:

Figure 1 is a side elevation of a plow lay having the device of my invention applied thereto.

Fig. 2 is a sectional view on the line 2—2 of Fig. 1.

The device is used in connection with the plow lay 1 and such plow lays are usually provided with a plurality of apertures 2 adjacent the upper edge thereof.

The device itself comprises two members 3 and 4 which are substantially quadrilateral in form, the former having sides 5, 6, 7 and 8 and the latter having sides 9, 10, 11 and 12. The sides 6 and 8 of the one and 10 and 12 of the other have offsets 13 and 14, respectively, and the two members are pivoted together as shown at 15 to provide tongs having the sides 7 and 11 as jaws. The side 7 carries, intermediate its extremities, a pin 16 which, when the device is in the position shown in Fig. 1 projects through one of the apertures 2 and the corresponding side of the member 3 has a bended portion 17 which permits the pin 16 to project through the plow lay without interfering with the closing of the tongs thus formed. The tongs are applied to the plow lay, as before stated, as shown in Fig. 1 and the member 9 carries a clip 18 which has a hook 19 which may be placed in engagement with the side 5 and will hold the tongs in clamped position. The two members 5 and 9 diverge slightly so that the clip 18 may be slid therealong to firmly close the jaws no matter what thickness the plow lay may be.

It is to be particularly noted that an important advantage of the present device resides in the fact that the clamping jaws or parts are substantially the length of the plow lay and thus provide a longer gripping surface than would otherwise be the case.

When the plow lay and device are set up as shown in Fig. 1, the plow lay may be repaired or otherwise manipuated without danger of its slipping out of the holder, and without danger of movement of the plow lay longitudinally of the holder or vice versa.

While, in the foregoing, I have described a specific embodiment of the present invention it is nevertheless to be understood that, in practice, I may resort to such modifications of a practical nature as fall within the scope of the invention as defined in the appended claim.

I claim:

A plow lay holder comprising a pair of frames formed of bars bent into substantially rectangular shape, the said frames being pivoted one within the other and forming elongated parallel gripping jaws coextensive with each other, one of the said jaws at its free end extending slightly beyond the other, a stud projecting inwardly from the said overlapping jaw, and an upwardly bent portion on the other jaw forming a recess to receive said stud when the jaws are closed.

In testimony wheref I affix my signature in presence of two witnesses.

GUY R. KEMPTHORNE.

Witnesses:

JENNIE WILLS,
M. S. BLOCK.

Copies of this patent may be obtained for five cents each, by addressing the "Commissioner of Patents, Washington, D. C."